United States Patent
Nagasaka

(10) Patent No.: US 7,538,907 B2
(45) Date of Patent: May 26, 2009

(54) IMAGE READING APPARATUS CAPABLE OF SELF-DIAGNOSIS USING CONSECUTIVE NUMBER OF ADJACENT ABNORMAL PIXELS

(75) Inventor: Hideaki Nagasaka, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 981 days.

(21) Appl. No.: 10/975,764

(22) Filed: Oct. 29, 2004

(65) Prior Publication Data

US 2005/0094215 A1  May 5, 2005

(30) Foreign Application Priority Data

Oct. 29, 2003  (JP) .............................. 2003-369440

(51) Int. Cl.
  H04N 1/46   (2006.01)
  H04N 1/04   (2006.01)
  H04N 1/409  (2006.01)

(52) U.S. Cl. ...................... 358/1.9; 358/461; 358/496; 358/497; 358/504; 358/474; 358/406; 358/483; 358/463; 358/3.26; 382/275; 382/254

(58) Field of Classification Search ................. 358/1.9, 358/448, 461, 496, 497, 504, 474, 498, 406, 358/483, 463, 3.26; 348/246; 382/275, 254

See application file for complete search history.

(56) References Cited

U.S. PATENT DOCUMENTS

| 7,253,932 B2 * | 8/2007 | Tsutsumi | 358/498 |
| 2002/0075527 A1 * | 6/2002 | Ito | 358/496 |
| 2002/0196476 A1 * | 12/2002 | Ozaki | 358/406 |
| 2003/0090742 A1 * | 5/2003 | Fukuda et al. | 358/448 |

FOREIGN PATENT DOCUMENTS

| EP | 1 085 746 A1 | 3/2001 |
| JP | A 06-008594 | 1/1994 |
| JP | A 08-172530 | 7/1996 |
| JP | A 09-030084 | 2/1997 |
| JP | A 10-028209 | 1/1998 |
| JP | A 10-313405 | 11/1998 |
| JP | A 11-004345 | 1/1999 |
| JP | A 2001-157053 | 6/2001 |
| JP | B2 3279828 | 2/2002 |

* cited by examiner

Primary Examiner—Edward L Coles
Assistant Examiner—Charlotte M Baker
(74) Attorney, Agent, or Firm—Oliff & Berridge PLC

(57) ABSTRACT

An apparatus for reading an image on a medium to be read using a light emitting device and a light receiving device is disclosed in which a determination is made that at least one of the light emitting device and the light receiving device malfunctions in the presence of a substantial coincidence between a consecutive number of abnormal pixels adjacent to each other and a reference value.

17 Claims, 5 Drawing Sheets

IMAGE READING APPARATUS CAPABLE OF SELF-DIAGNOSIS USING CONSECUTIVE NUMBER OF ADJACENT ABNORMAL PIXELS

This application is based on Japanese Patent Application No. 2003-369440 filed Oct. 29, 2003, the content of which is incorporated hereinto by reference.

CROSS-REFERENCE TO RELATED APPLICATIONS

Not Applicable.

BACKGROUND OF THE INVENTION

1. Field of the Invention

The present invention relates to an apparatus for reading an image on a medium to be read, the apparatus including a light emitting device illuminating the medium to be read and a light receiving device receiving reflected light from the medium to be read.

2. Description of the Related Art

A facsimile machine is known as an example of a type of image reading apparatus. The type of apparatus is constructed to include: a light emitting device that emits light for illuminating an original document (i.e., a medium to be read); and an image sensor (functioning as a light receiving device or an image pickup device) that receives reflected light from the original document. Because of the configuration, the apparatus is operated to obtain a plurality of light sensitive signals from a plurality of light receiving elements which are aligned with each other in the image sensor, respectively. The plurality of light receiving elements are respectively associated with a plurality of pixels. The apparatus is further operated to read an image on the original document based upon successive sets of the light sensitive signals obtained from the respective plurality of light receiving elements.

For this type of image reading apparatus, a case exists in which a foreign matter is present in an optical path along which light travels from the light emitting device into the image sensor for light reception, upon reflection at the original document on the way. In this case, the actual amount of light received at at least one of the plurality of light receiving elements which is positioned at a corresponding portion of the optical path to the position of a foreign matter is different from a normal amount of that. It is therefore likely that the apparatus will become incapable of a normal image reading of an image on the original document.

Another case exists in which at least one of a plurality of light emitting elements of the light emitting device or at least one of the plurality of light receiving elements of the image sensor malfunctions. In this case, the malfunction results in an abnormality in obtaining a light sensitive signal from each corresponding one of the plurality of light receiving elements, and it is therefore also likely that the apparatus will become incapable of a normal image reading of an image on the original document.

Japanese Patent Publication No. Hei 08-172530 discloses a conventional technique of detecting an abnormality due to a foreign matter. The conventional technique is practiced such that a white reference member is illuminated with light from a light emitting device, and such that a light sensitive signal is obtained from each corresponding one of a plurality of light receiving elements of an image sensor. Subsequently, a detecting operation is performed for detecting at least one abnormal pixel of a plurality of pixels. The plurality of pixels correspond to the plurality of light receiving elements, respectively, and the at least one abnormal pixel corresponds to at least one of the plurality of light receiving elements which outputs a light sensitive signal indicative of the amount of light received not larger than a predetermined one. During the repeated detecting operations, when the detection of abnormal pixels is continuously repeated a predetermined number of times, it is determined that an optical system, or the like used in the above conventional technique has suffered a persistent abnormality (due to contamination, a foreign matter such as a shading matter, or degradation). As a result, the user is alerted to make the user to realize the fact.

SUMMARY OF THE INVENTION

The above conventional technique, however, which is configured only for determining whether or not a persistent abnormality is present on the basis of the number of the detections of abnormal pixels, is incapable of accurately identifying an abnormality due to a failure of the light emitting device and/or the image sensor.

The conventional technique therefore causes a problem that no information to help the user in an attempt to identify which is the proper solution, the repair and/or replacement of the light emitting device and/or the light receiving device, or the removal of a foreign matter and/or dirt, perplexes the user.

In view of the above-described circumstances, it is therefore an object of the present invention is to provide an image reading apparatus enabling a more accurate detection of an abnormality due to a failure of a light emitting device and/or a light receiving device.

According to the present invention, there is provided an apparatus for causing, prior to a normal reading operation of an image, a light emitting device to perform a light emission, obtaining a plurality of light sensitive signals from a plurality of light receiving elements, respectively, in response to the light emission, and determining that, based on the obtained plurality of light sensitive signals, at least one of the light emitting device and the light receiving device malfunctions in the presence of a substantial coincidence between a consecutive number of abnormal ones adjacent to each other of a plurality of pixels, and a reference value.

If a foreign matter enters an optical path between the light emitting device and the light receiving device, at least one of the plurality of pixels will turn to be at least one abnormal pixel. On the other hand, if at least one of the light emitting device and the light receiving device malfunctions, at least one of the plurality of pixels will turn to be at least one abnormal pixel, as well. At least one of the light emitting device and the light receiving device is hereinafter referred to as "optical device."

Compared these two events with each other with respect to the number of abnormal pixels, namely, the consecutive number of abnormal pixels adjacent to each other, a tendency exists that the consecutive number of abnormal pixels where the abnormal pixels are generated due to a failure of the optical device is different from, typically, is larger than where the abnormal pixels are generated due to a foreign matter in the optical path.

The above findings are derived by focusing on the fact that, in the event of a failure of the optical device, it is more likely that adjacent ones of the plurality of elements (light emitting elements or light receiving elements) which constitute the optical device malfunction concurrently with each other, rather than that only one of the plurality of elements of the optical device malfunctions. The reasons for these findings will be described below in more detail.

There is a case in which the optical device is configured such that a plurality of elements constituting the optical device is segmented into a plurality of blocks or chips. In this case, a failure of a single one of the plurality of elements which belongs to one of the block or chips may induce failures of all the other ones of the plurality of elements which belong to the same block or chip.

Therefore, the consecutive number of abnormal pixels enables a distinction with respect to the cause of abnormal pixel between a failure of the optical device and the presence of a foreign matter in the optical path.

In view of the aforementioned findings, the image reading apparatus provided according to the present invention is operated such that a determination is made that at least one of the light emitting device and the light receiving device malfunctions in the presence of a substantial coincidence between a consecutive number of abnormal pixels adjacent to each other and a reference value.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities show. In the drawings.

DETAILED DESCRIPTION OF THE INVENTION

Figure 1:
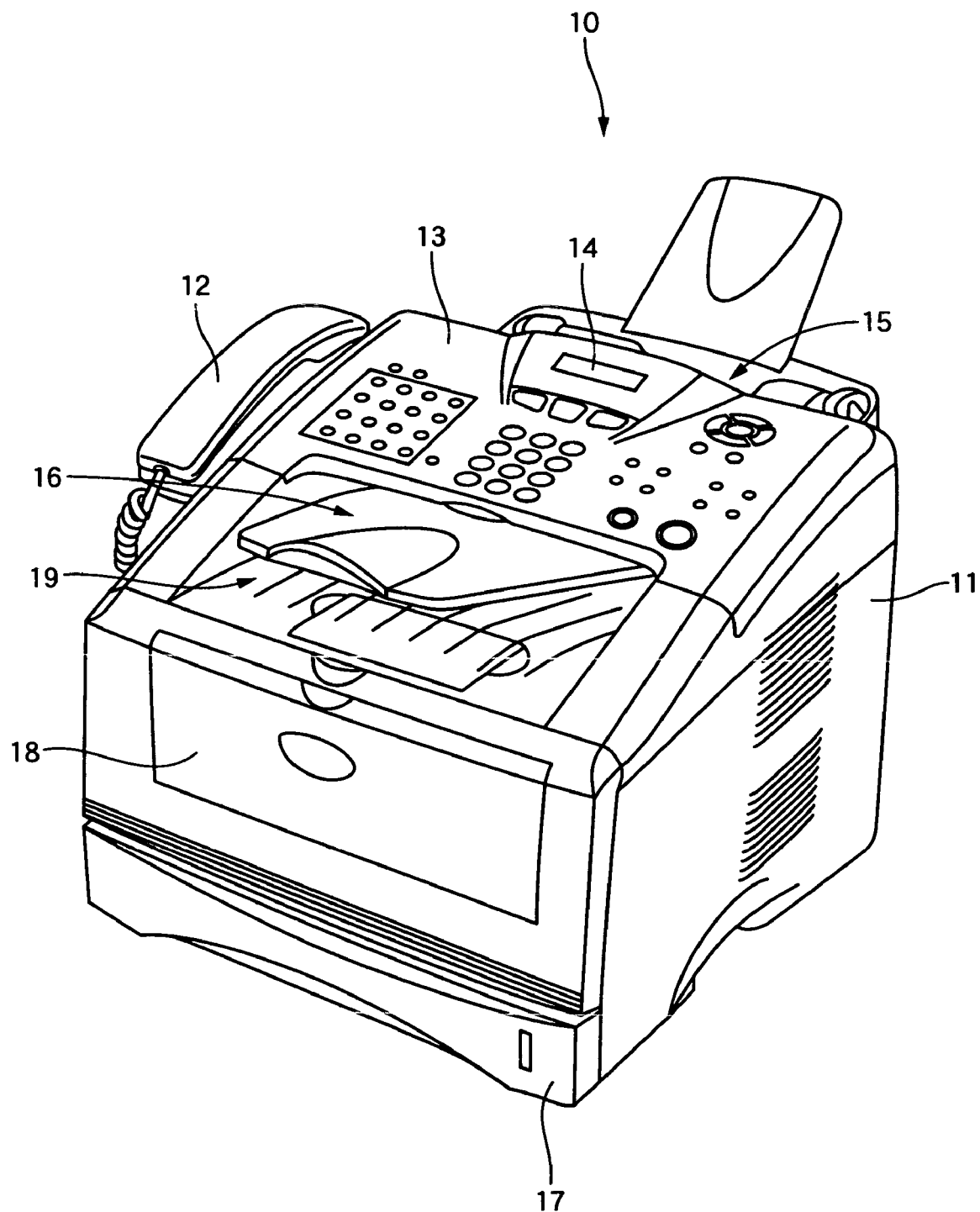
FIG. 1 is a perspective view illustrating a facsimile machine according to an embodiment of the present invention.

The object mentioned above may be achieved according to any one of the following modes of this invention.

These modes will be stated below such that these modes are sectioned and numbered, and such that these modes depend upon the other mode or modes, where appropriate. This is for a better understanding of some of a plurality of technological features and a plurality of combinations thereof disclosed in this description, and does not mean that the scope of these features and combinations is interpreted to be limited to the scope of the following modes of this invention.

That is to say, it should be interpreted that it is allowable to select the technological features which are stated in this description but which are not stated in the following modes, as the technological features of this invention.

Furthermore, stating each one of the selected modes of the invention in such a dependent form as to depend from the other mode or modes does not exclude a possibility of the technological features in a dependent-form mode to become independent of those in the corresponding depended mode or modes and to be removed therefrom. It should be interpreted that the technological features in a dependent-form mode is allowed to become independent according to the nature of the corresponding technological features, where appropriate.

(1) An apparatus for reading an image on a medium to be read, comprising:

a light emitting device that emits light to illuminate the medium;

a light receiving device, including a plurality of light receiving elements aligned with each other, that receives a reflected light from the medium via the plurality of light receiving elements; and a controller that obtains light sensitive signals from the respective plurality of light receiving elements in association with a respective plurality of pixels of the image which correspond to the respective plurality of light receiving elements, and that reads the image based on the obtained light sensitive signals, wherein the controller causes, prior to a normal reading operation of the image, the light emitting device to perform a light emission, obtains the plurality of light sensitive signals from the plurality of light receiving elements, respectively, in response to the light emission, and determines that, based on the obtained plurality of light sensitive signals, at least one of the light emitting device and the light receiving device malfunctions in the presence of a substantial coincidence between a consecutive number of abnormal ones adjacent to each other of the plurality of pixels, and a reference value.

In the event of a failure of the light emitting device and/or the light receiving device, the number of abnormal pixels, namely, the consecutive number of abnormal pixels adjacent to each other is dependent upon such as an area which is illuminated by light from the light emitting device, and/or an area in which the light receiving device receives light, for example. On the other hand, the consecutive number of abnormal pixels due to a foreign matter is dependent upon the size of the foreign matter or the like. Therefore, it is considered that there is a small possibility that there is an coincidence in consecutive number between the abnormal pixels due to a failure of the light emitting device and/or the light receiving device, and the abnormal pixels due to a foreign matter.

In view of the above findings, the apparatus according to the above mode (1) is so configured as to determine, on the basis of the consecutive number of abnormal pixels adjacent to each other, that an abnormality is present in the apparatus due to a failure of at least one of the light emitting device and the light receiving device.

The "image" described in the above mode (1) may include such as a text image, a picture image, and a photograph image. An example of the "light receiving device" may be a contact type of image sensor in which a plurality of light receiving elements are aligned with each other.

(2) The apparatus according to mode (1), wherein the controller comprises:

(a) a detecting device that causes, prior to the normal reading operation, the light emitting device to perform the light emission, obtains the plurality of light sensitive signals from the plurality of light receiving elements, respectively, in response to the light emission, and detects, based on the obtained plurality of light sensitive signals, at least one of the plurality of pixels as at least one abnormal pixel;

(b) a first determining device that determines whether or not the consecutive number of the detected at least one abnormal pixel substantially coincides with the reference value; and (c) a second determining device that determines that at least one of the light emitting device and the light receiving device malfunctions when the first determining device has determined that the consecutive number substantially coincides with the reference value.

(3) The apparatus according to mode (2), wherein the second determining device determines that a foreign matter is present between the light emitting device and the light receiving device when the first determining device has determined that the consecutive number does not substantially coincide with the reference value.

The apparatus according to the above mode (3), a determination is made that a foreign matter (such as dirt and dust) is present between the light emitting device and the light receiving device (i.e., in an optical path along which light travels from the light emitting device into the light receiving device for light reception, upon reflection at an original document on the way), if the consecutive number of abnormal ones of the plurality of pixels does not substantially coincide with the reference value. Thus, the apparatus enables a distinction with respect to the cause of the abnormal pixels between the abnormal pixels due to a failure of at least one of the light emitting device and the light receiving device, and the abnormal pixels due to a foreign matter on the basis of the consecutive number of the abnormal pixels.

An example of the "foreign matter" in the above mode (3) may be an object, such as a waste, dust, and, dirt which lowers the amount of light received at the light receiving device.

(4) The apparatus according to mode (2) or (3), wherein the detecting device causes, prior to the normal reading operation, the light emitting device to perform the light emission, obtains the plurality of light sensitive signals from the respective plurality of light receiving elements in response to the light emission, and detects at least one of the plurality of pixels which corresponds to at least one of the plurality of light receiving elements which has received light at a level not higher than a predetermined level as the at least one abnormal pixel.

In the apparatus according to the above mode (4), the plurality of light sensitive signals are produced so as to correspond to the amount of light received at the respective plurality of light receiving elements, and at least one abnormal pixel of the plurality of pixels is detected depending on a comparison between the amount of light received represented by the light sensitive signals obtained and the predetermined level. Therefore, the adjustment of the predetermined level to an appropriate one facilitates a more thorough detection of at least one abnormal pixel.

(5) The apparatus according to any one of modes (2) through (4), wherein the detecting device causes the light emitting device to illuminate a white reference member, obtains the plurality of light sensitive signals from the respective plurality of light receiving elements upon reception by the light receiving device of a reflected light from the white reference member, and determines the at least one abnormal pixel based on the obtained plurality of light sensitive signals.

The apparatus according to the above mode (5) is configured such that the amounts of light received at the respective plurality of light receiving elements are detected using a reflected light from the white reference member as a reference light, thereby to detect abnormal pixels based on the detected amounts of light received. Therefore, the apparatus improves the accuracy in detecting abnormal pixels owing to the uniform distribution in intensity of the reference light.

However, the practice of the present invention does not always require the use of the white reference member for forming the reference light. For example, the apparatus according to any one of the above modes (2) through (4) may be practiced in such a mode that the detecting device causes the light emitting device to illuminate a white portion of the medium to be read in which an image is not depicted thereon, namely, an unrecorded portion of the medium to be read. In this mode, at least one abnormal pixel of the plurality of pixels is detected based upon the plurality of light sensitive signals which the light receiving device delivers in response to reception of light reflected from the unrecorded portion.

(6) The apparatus according to any one of modes (1) through (5), wherein the controller causes the light emitting device to illuminate a white reference member, prior to the normal reading operation of the image, obtains the plurality of light sensitive signals from the plurality of light receiving elements, respectively, in response to reception by the light receiving device of a reflected light from the white reference member, and performs a white reference correction and the detection of abnormal pixels based on the obtained plurality of light sensitive signals.

The apparatus according to the above mode (6) is adapted such that at least one abnormal pixel is detected at the time that the plurality of light sensitive signals are obtained for the white reference correction (shading correction), using the obtained plurality of light sensitive signals. Thus, the apparatus according to the above mode (6) does not require an additional capture of the plurality of light sensitive signals from the respective plurality of light receiving elements for detecting at least one abnormal pixel, allowing an efficient determination as to whether or not an abnormality is present in the apparatus.

(7) The apparatus according any one of modes (2) through (5), wherein the light emitting device comprises a plurality of light emitting elements aligned in a scanning direction of the light receiving device, the plurality of light emitting elements being segmented into a plurality of blocks aligned in the scanning direction, the light emitting device being driven on a per block basis, wherein there are selected as a plurality of selected light-emitting-elements ones of the plurality of light emitting elements which belong to at least one of the blocks, a number of the at least one block being predetermined, wherein the reference value is a set value set based on a number of ones of the plurality of pixels which are positioned in an illuminated area on the medium to be read which is illuminated with light exiting from the plurality of selected light-emitting-elements, and wherein the second determining device determines that the light emitting device malfunctions when the first determining device has determined that the consecutive number substantially coincides with the set value.

The apparatus according to the above mode (7) would allow the detection of a kind of abnormality in the apparatus due to a failure of the light emitting device separately from other kinds of abnormalities.

(8) The apparatus according to mode (7), wherein the plurality of light emitting blocks each comprise the same number of ones of the plurality of light emitting elements, and wherein the set value is as a predetermined number of integer times large as a number of ones of the plurality of pixels which are positioned within an illuminated area on the medium to be read which is illuminated with light exiting from ones of the plurality of light emitting elements which correspond to one of the plurality of light emitting blocks.

(9) The apparatus according to any one of modes (2) through (8), wherein the light receiving device comprises a plurality of light receiving blocks, each of which includes a plurality of light receiving elements, respectively, with the plurality of light receiving blocks being aligned in a scanning direction of the light receiving device, wherein ones of the plurality of light receiving elements which belong to a predetermined number of ones of the plurality of light receiving blocks are selected as a plurality of selected light-receiving-elements, respectively, wherein the reference value is a set value set based on a number of ones of the plurality of pixels, reflected light from which enters the plurality of selected light-receiving-elements, and wherein the second determining device determines that the light receiving device malfunctions, in response to a determination by the first determining device that the consecutive number substantially coincides with the set value.

The apparatus according to the above mode (9) would allow the detection of a kind of abnormality in the apparatus due to a failure of the light receiving device separately from other kinds of abnormalities.

The apparatus according to the above mode (9) may be practiced in the following arrangement, for instance. In the arrangement, the light emitting device comprises a plurality of light emitting elements aligned in a scanning direction of the light receiving device, the plurality of light emitting elements being segmented into a plurality of blocks aligned in the scanning direction, the light emitting device being driven on a per block basis, wherein there are selected as a plurality of selected light-emitting-elements ones of the plurality of light emitting elements which belong to at least one of the blocks, a number of the at least one block being predetermined, wherein the reference value includes: (a) a first set-value set based on a number of ones of the plurality of pixels which are positioned in an illuminated area of the medium to be read which is illuminated with light exiting from the plurality of selected light-emitting-elements; and (b) a second-set value set based on a number of ones of the plurality of pixels, reflected light from which enters the plurality of selected light-receiving-elements, and wherein the second determining device determines that the light emitting device malfunctions when the first determining device has determined that the consecutive number substantially coincides with the first set-value, while the second determining device determines that the light receiving device malfunctions when the first determining device has determined that the consecutive number substantially coincides with the second set-value.

This arrangement would allow a detection of a kind of abnormality due to a failure of the light emitting device and a kind of abnormality due to a failure of the light receiving device, separately from each other.

(10) The apparatus according to mode (9), wherein the plurality of light receiving blocks each comprise the same number of ones of the plurality of light receiving elements, and wherein the set value is as a predetermined number of integer times large as a number of ones of the plurality of pixels, reflected light from which enters ones of the plurality of light receiving elements which belong to one of the plurality of light receiving blocks.

(11) The apparatus according to any one of modes (2) through (10), further comprising an indicator that indicates a determination made by the second determining device.

The apparatus according to the above mode (11) allows a user to realize via the indicator which kind of abnormality occurs in the apparatus.

(12) The apparatus according to mode (11), wherein the indicator is varied in action for indication depending on a frequency at which the first determining device has repeatedly determined that the consecutive number substantially coincides with the reference value.

The apparatus according to the above mode (12) may be practiced in such a mode as to provide to the user variable information on solutions depending on an actual coincidence frequency that the first determining device repeatedly determines that the consecutive number substantially coincides with the reference value. In this mode, the apparatus may be operated so as to inform the user to prompt the user to power on the apparatus again until the actual coincidence frequency reaches a preset coincidence frequency, and so as to inform the user that the apparatus requires to be repaired, after the actual coincidence frequency exceeds the preset coincidence frequency, for example.

(13) The apparatus according to mode (11) or (12), wherein the indicator is varied in action for indication depending on a frequency at which the second determining device has repeatedly determined that at least one of the light emitting device and the light receiving device is abnormal.

The apparatus according to the above mode (13) may be practiced in such a mode as to provide to the user variable information on solutions depending on a determination frequency that the second determining device repeatedly determines that at least one of the light emitting device and the light receiving device malfunctions. In this mode, the apparatus may be operated so as to inform the user to prompt the user to power on the apparatus again until the determination frequency reaches a preset determination frequency, and so as to inform the user that the apparatus requires to be repaired, after the determination frequency exceeds the preset determination frequency, for example.

(14) The apparatus according to any one of modes (1) through (13), further comprising a transmitter that transmits image data indicative of an image which has been read by the apparatus, to a destination-side communication equipment via a communication network, the transmitter being adapted to become incapable of a transmission of image data indicative of an image which has been read by the apparatus, in response to a determination by the controller that at least one of the light emitting device and the light receiving device is abnormal.

The apparatus according to the above mode (14) does not permit an image-data transmission in the event of an abnormality in the apparatus, to thereby prevent image data which has been deteriorated in quality due to an abnormality occurring during the image reading operation, from being transmitted from the user-sender to a communication equipment at the destination-side. As a result, the apparatus avoids the user-sender from having a misunderstanding to make the user-sender falsely recognize that image data which has been transmitted is normal, although the image data is abnormal in fact. In addition, the apparatus avoids a recipient at the destination side from receiving abnormal image data.

The "communication network" in the above mode (14) may be interpreted to include at least one of a telephone line, the Internet, a Local Area Network (LAN), and the like. The "transmitter" in the above mode (14) may be interpreted to include at least one of a wired transmitter and a wireless transmitter.

(15) The apparatus according any one of modes (1) through (14), further comprising an image forming device that forms an image on a recording medium to represent the image read by the apparatus, the image forming device being adapted to form the image read by the apparatus, even in response to a determination of the controller that at least one of the light emitting device and the light receiving device is abnormal.

Where an abnormality exists during the image reading operation, no representation of an optically-captured image poor in quality due to the existing abnormality disables the user from verifying the actual quality of the captured image. By contrast, the apparatus according to the above mode (15) is operated such that the image forming device forms on a recording medium a captured image deteriorated in quality due to an abnormality during the image reading operation, enabling the user to verify the quality of the captured image. Further, the apparatus is advantageous, because of the above image formation, to the user who wishes to obtain an image formed using data indicative of the captured image even when the quality of the captured image is slightly poor.

The "recording medium" in the above mode (15) may be interpreted to include a display screen of a display device, a medium to be printed such as a sheet to be printed, etc.

(16) A facsimile machine capable of reading an image on a medium to be read, comprising:

a light emitting device that emits light to illuminate the medium;

a light receiving device, including a plurality of light receiving elements aligned with each other, that receives a reflected light from the medium via the plurality of light receiving elements;

a controller obtains light sensitive signals from the respective plurality of light receiving elements in association with a respective plurality of pixels of the image which correspond to the respective plurality of light receiving elements, and that reads the image based on the obtained light sensitive signals;

a transmitter that externally transmits image data indicative of the image which has been read by the controller; and an image forming device that forms an image on a recording medium to represent the image which has been read by the controller, wherein the controller causes, prior to a normal reading operation of the image, the light emitting device to perform a light emission, obtains the plurality of light sensitive signals from the plurality of light receiving elements, respectively, in response to the light emission, and determines that, based on the obtained plurality of light sensitive signals, at least one of the light emitting device and the light receiving device malfunctions in the presence of a substantial coincidence between a consecutive number of abnormal ones adjacent to each other of the plurality of pixels, and a reference value.

The facsimile machine according to the above mode (16) may be practiced by incorporating thereinto any one of the above modes (1) to (15)

(17) The facsimile machine according to mode (16), wherein the controller is adapted such that, upon determination by the controller that at least one of the light emitting device and the light receiving device malfunctions, a facsimile function is not allowed, while at least one of a copying and a scanning function is allowed.

Several presently preferred embodiments of the invention will be described in more detail by reference to the drawings in which like numerals are used to indicate like elements throughout.

FIGS. 1 through 5 show a facsimile machine 10 as an example of an image forming device according to an embodiment of the present invention. The facsimile machine 10 is a multi-function peripheral device that accommodates various functions including a facsimile function, a scanning function, a copy function, and the like.

The facsimile function allows transmission of image data from the facsimile machine 10 to a communication equipment at a destination side, such as a remote facsimile machine. The scanning function allows image data produced by the facsimile machine 10 to be delivered to a computer or the like, for enabling the user of the facsimile machine 10 to identify, through a monitor screen of the computer or the like, how accurate to read an image depicted on an original document W. The copy function allows image captured by the facsimile machine 10 to be represented on a recording medium, for enabling the user to identify, through the recording medium, how accurate to read an image depicted on an original document W.

FIG. 1 shows the entire exterior of the facsimile machine 10. Referring to FIG. 1, the facsimile machine 10 includes a handset 12 at one of lateral sides of a body 11 of the facsimile machine 10. The facsimile machine 10 further includes a control panel 13 which has a plurality of buttons including a dial button, etc., at the top of the rear portion of the body 11. The control panel 13 includes a liquid crystal display (LCD) 14 which functions as a device for displaying various kinds of information, in the center of the rear portion of the control panel 13.

As shown in FIG. 1, the facsimile machine 10 includes a document inlet 15 located rearward of the control panel 13. In operation, into the document inlet 15, there is inserted an original document to be transmitted to a destination-side communication equipment when the facsimile function is performed, while there is inserted an original document to be copied when the copy function is performed, with one of both sides of the respective original documents to be read facing down. In any case, an original document that has been inserted into the document inlet 15 in the above-mentioned manner is read with regard to image data representing an image depicted on the original document by means of a scanner 28 (see FIG. 2), as will be described below, and subsequently is ejected from a document exit 16 provided at the top of the front portion of the body 11.

As shown in FIG. 1, the facsimile machine 10 further includes a recording-sheet storage 17 at the bottom of the body 11. The recording-sheet storage 17 is capable of storing a plurality of recording sheets in a stack manner. The recording sheet is an example of a recording medium to be recorded, and the example may be replaced with a sheet to be printed.

The recording-sheet storage 17 is of a drawer-like type in which the recording-sheet storage 17 changes in position, upon drawn out forwardly, from a closed position shown in FIG. 1 to an open position enabling sheets to be inserted for storage into the recording-sheet storage 17. When the printing function is performed, a recording sheet is supplied from the recording-sheet storage 17, is then printed by a printer 31 (see FIG. 2) described below, and is finally ejected from a recording-sheet exit 19 disposed at the front face of the body 11.

The facsimile machine 10 further includes a tray 18. The tray 18 changes in position between a closed position at which the tray 18 stands upright as shown in FIG. 1 and an open position at which the tray 18 is inclined forward from the upright position, depending on a pivotal movement of the tray 18 about the lower end of the tray 18. At the open position, the tray 18 can store a plurality of recording sheets. The recording sheets stored in the tray 18 are supplied to the printer 31 and are then printed by the printer 31, resulting in exit from the recording-sheet exit 19, in the same manner as the recording-sheets stored in the recording-sheet storage 17.

Figure 2:
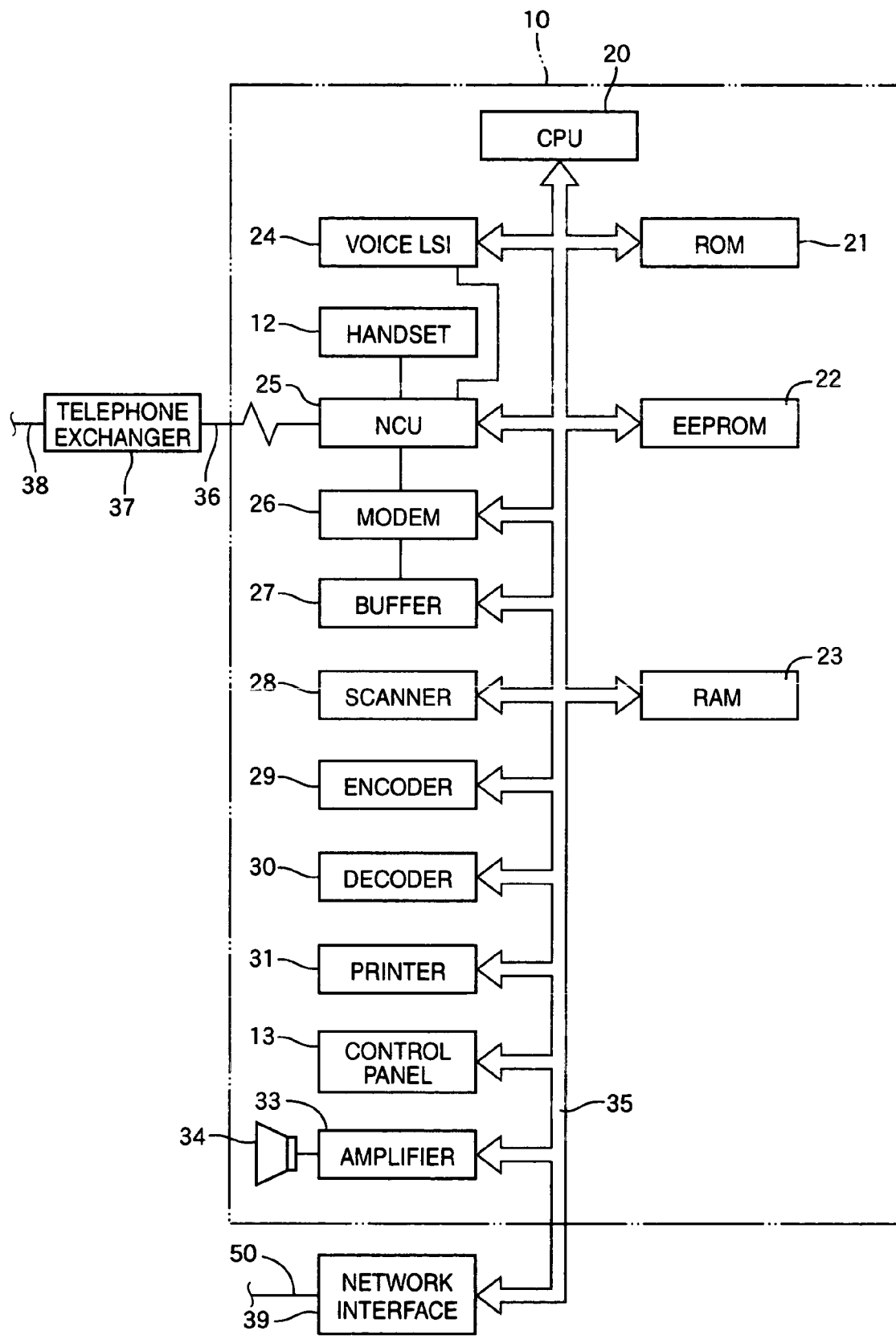
FIG. 2 is a schematic block diagram illustrating the electrical construction of the facsimile machine shown in FIG. 1.

FIG. 2 shows the electrical configuration of the facsimile machine 10 in a block diagram. The facsimile machine 10 is provided with a CPU 20, a ROM 21, an EEPROM 22 as a non-volatile memory, a RAM 23, a voice LSI 24, a network control unit (hereinafter, referred to as "NCU") 25, a modem 26, a buffer 27, a scanner 28, an encoder 29, a decoder 30, the printer 31, the control panel 13, an amplifier 33, a speaker 34, and a network interface 39. These constituents are electrically connected to each other via a bus line 35.

Among these constituents, the NCU 25 is for a network control, via which the facsimile machine 10 is connected with a telephone line 36. The NCU 25 performs operations to receive call signals, telephone numbers of destination-side communication equipment, and the like, which are transmitted from a telephone exchanger 37, and to transmit to the telephone exchanger 37 dial signals in dialing, depending upon the operator operating the buttons provided in the control panel 13. The NCU 25 further transmits and receives analog voice signals during telephone conversations.

The CPU 20 controls the above-described plurality of constituents connected to each other via the bus line 35, depending on various types of signals transmitted or received via the NCU 25, to thereby perform data communications, such as a facsimile function operation and a telephone function operation.

The ROM 21 is a non-rewritable memory in which there has been stored a control program, etc., to be executed in the facsimile machine 10. The EEPROM 22 is a rewritable nonvolatile memory enabling data stored therein to be held even after the power down of the facsimile machine 10. The RAM 23 is a memory in which various data including image data, audio data, etc., is temporarily stored in each operation of the facsimile machine 10. The RAM 23 has a battery backup function enabling data once inputted into the RAM 23 to be held for a predetermined period of time even after the power down of the facsimile machine 10.

The voice LSI 24 transforms analog audio signals received via the NCU 25, into digital audio signals, and also transforms digital audio signals generated within the facsimile 10, into analog audio signals, resulting in output the analog audio signals to the NCU 25 or the speaker 34 (including the amplifier 33).

The modem 26 transports image information upon modulation/demodulation and transmits and receives various types of procedure signals for a transmission control. The buffer 27 temporarily stores data which includes encoded image information to be transmitted and received between the facsimile machine 10 and a destination-side communication equipment (e.g., a destination-side facsimile machine). The scanner 28 reads or optically captures an image of an original document inserted into the document inlet 15 in the form of image data representing the image of the original document. A more specific configuration of the scanner 28 will be described below.

The encoder 29 encodes the image data read by means of the scanner 28. The decoder 30 retrieves the image data stored in the RAM 23 therefrom, and then transforms (decodes) the retrieved image data into data for forming an image. The decoded image data is printed on a recording sheet by means of the printer 31 after a completion of a transformation process described below.

The control panel 13 is manipulated by the user in various kinds of manners for set-up of the facsimile machine 10, etc. The amplifier 33 drives for sound emission the speaker 34 which is connected with the amplifier 33, to thereby output call sounds and voices. The network interface 39 is for achieving communications via a LAN 50, such as transmission and reception of electrical mail messages, for example.

The facsimile machine 10, having the above-described configuration, is connected to the telephone line 36 via the NCU 25. The telephone line 36 is connected to the telephone exchanger 37 which is in turn connected to another telephone exchanger 37 via another telephone line 38. The telephone exchanger 37 is further connected via still another telephone line to still another device such as a destination-side communication equipment.

Figure 3:
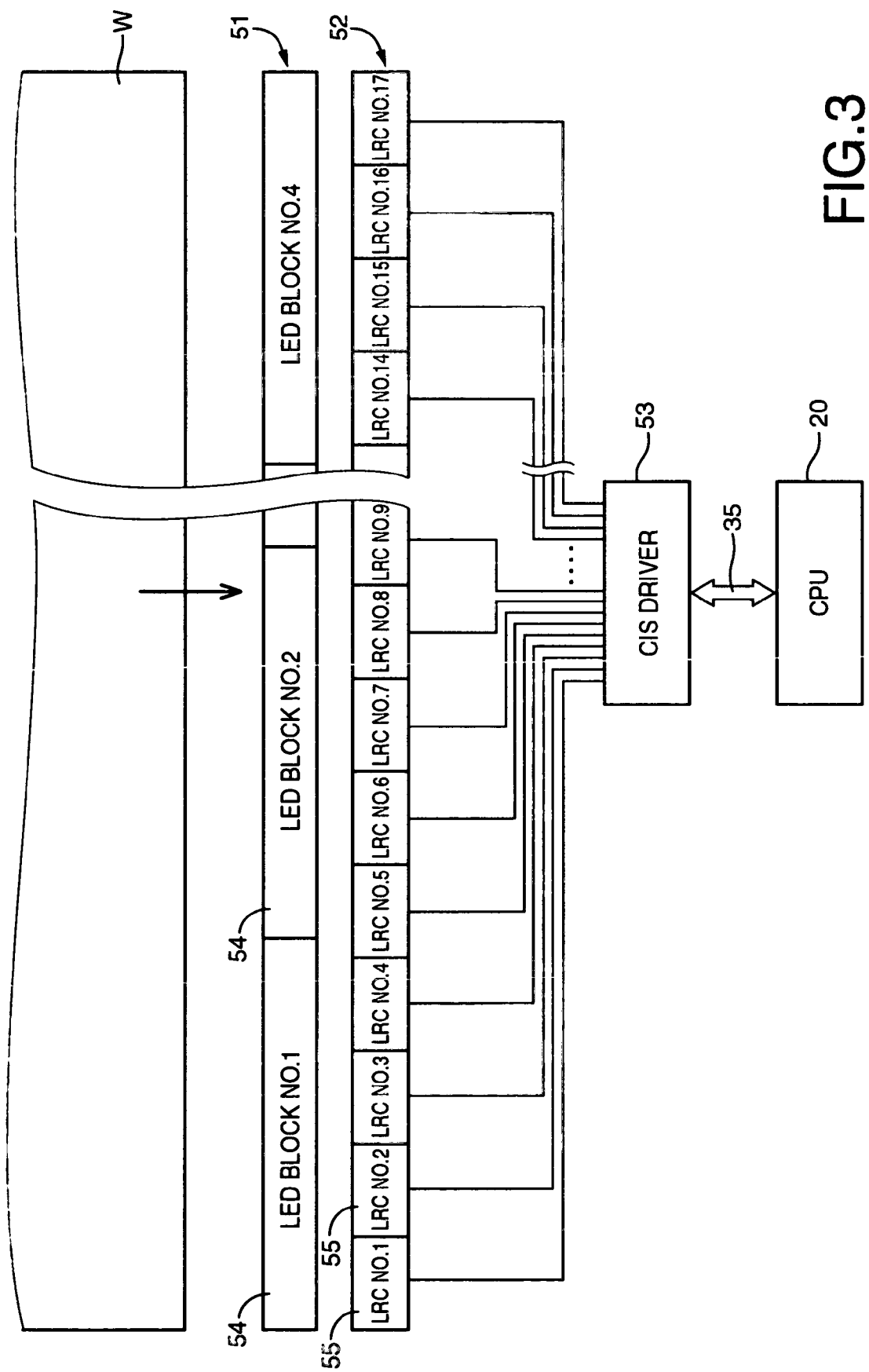
FIG. 3 is a diagram schematically illustrating the configuration of a scanner shown in FIG. 2.

FIG. 3 shows the configuration of the scanner 28 functioning as an image reading section of the facsimile machine 10. The scanner 28 includes a light emitting device 51; an image sensor (an example thereof is a contact-type image sensor, which is hereinafter referred to as "CIS") 52; and a CIS driver 53. A CIS glass (not shown) is positioned on the underside of a travel path along which an original document W (a medium to be read) is delivered. The light emitting device 51, located under the CIS glass, emits therefrom light toward the CIS glass. The CIS 52 receives the reflected light from the CIS glass.

The light emitting device 51 includes a plurality of LEDs. The plurality of LEDs are aligned with each other in a line in a direction perpendicular to the direction of the aforementioned travel path over the entire width of the original document W. The direction of the travel path, which is indicated by the arrow in FIG. 3, means a secondary scanning direction of the facsimile machine 10, while the direction perpendicular to the secondary scanning direction means a primary scanning direction of the facsimile machine 10.

In the present embodiment, the light emitting device 51 has been segmented into 4 blocks each having 7 LEDs, totally having 28 LEDs, for example. The light emitting device 51 has been chip-manufactured on a per block basis and is therefore caused to be driven individually for each block. Because of the configuration, if a single one of the LEDs fails due to degradation in performance of the single LED, for example, all the 7 LEDs belonging to one of the 4 blocks to which the fault single LED belongs become together incapable of emitting light. Each block of the light emitting device 51 will be referred to as "LED block 54" below.

Although the light emitting device 51 is so configured in the present embodiment as to include an array of a plurality of light emitting elements in the form of an array of a plurality of LEDs, the light emitting device 51 may be replaced with a unitary light-emitting apparatus or appliance such as a single cold-cathode fluorescent-lamp extending over the entire width of an original document W, without departing from the spirit and scope of the present invention.

The CIS 52 includes a plurality of photodiodes (hereinafter abbreviated as "PDs") as a plurality of light receiving elements. The plurality of PDs are aligned with each other in a line in a direction perpendicular to the direction of the aforementioned travel path over the entire width of the original document W, in the same manner as the plurality of LEDs aligned in the light emitting device 51.

In the present embodiment, the CIS 52 has totally 2,584 PDs aligned with each other in a line. This configuration enables the CIS 52 to read image data corresponding to 2,584 pixels at the maximum per single scanning line on the original document W. More specifically, the CIS 52 includes the 17 light receiving chip 55 each having 152 PDs, with these chips 55 being aligned with each other in a line.

The CIS 52 is designed to be driven on a per chip basis, similarly with the light emitting device 51. As a result, if a single one of the PDs fails due to degradation in performance of the single PD, for example, all the 152 PDs belonging to one of the 17 light receiving chips 55 to which the fault single PD belongs become together incapable of receiving light. In view of the fact that a single PD outputs a light sensitive signal corresponding to a single pixel, the PDs will be referred to as "pixels" below, where appropriate.

The CIS driver 53 is activated in response to control signals from the CPU 20, resulting in supply of drive signals to the plurality of LEDs which constitute the light emitting device 51 on a per block basis, for the activation of the light emitting device 51. Following that, the CIS driver 53 supplies drive signals sequentially to the respective 17 light receiving chips 55 which constitute the CIS 52, to thereby activate the CIS 52. The CIS driver 53 further performs the operation to retrieve from the light receiving chips 55 the sequence of respective light-sensitive-signals corresponding to respective 152 pixels. The retrieved sequence, upon digitalization by an A/D converter not shown, is delivered to the CPU 20.

Because of the above configuration, the scanner 28 illuminates, with light exiting from the light emitting device 51 and then passing through the CIS glass, the original document W which is advanced along the travel path. The scanner 28 further receives at the CIS 52 light which has returned thereto after reflecting from the original document W and then passing again through the CIS glass, to thereby successively obtain the sequence of light sensitive signals (i.e., the sequence of light sensitive data) for each of a plurality of scanning lines on the original document W.

Figure 4:
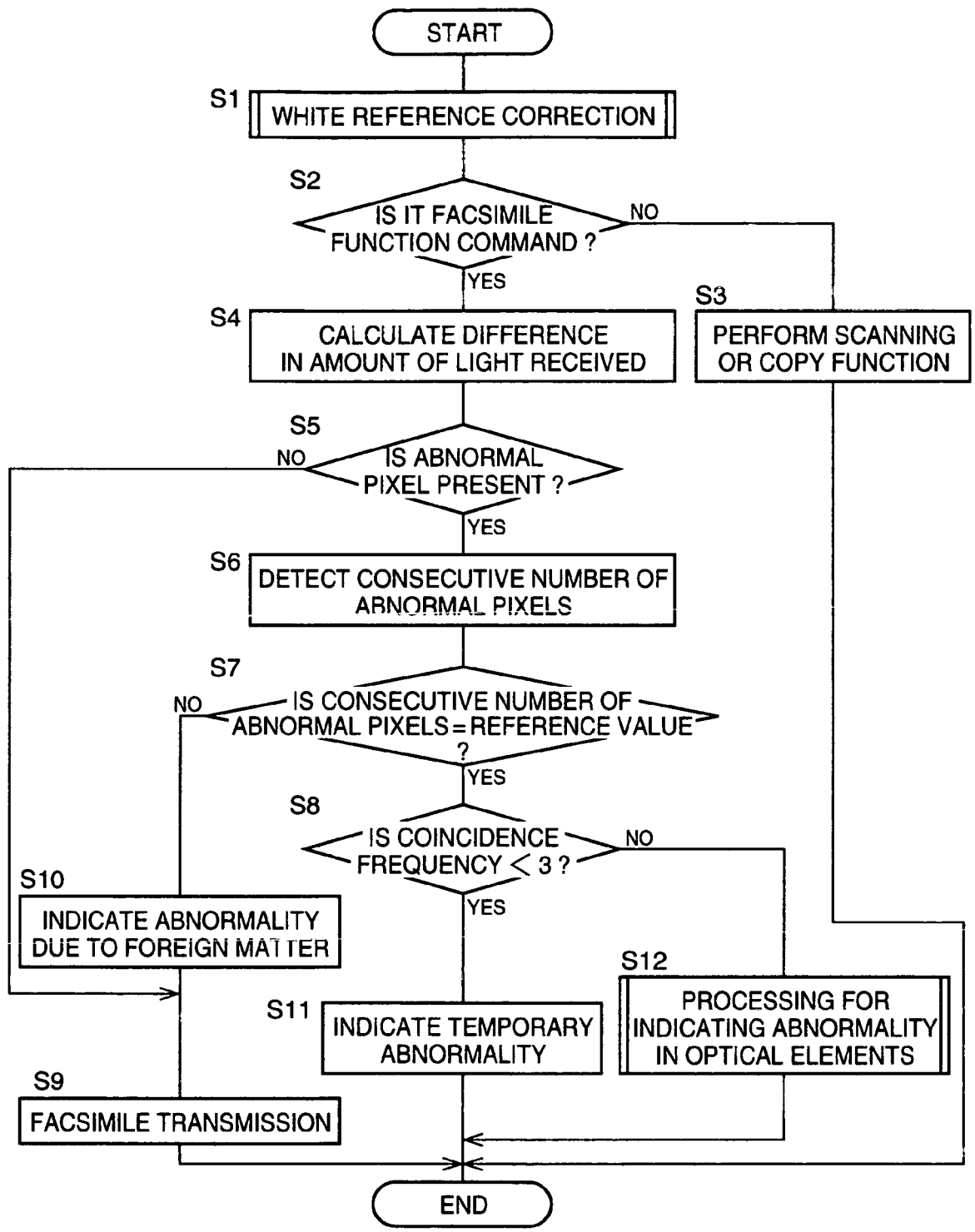
FIG. 4 is a flow chart illustrating, for the sake of a conceptual representation, a read-control program executed by a CPU shown in FIG. 2.
Figure 5:
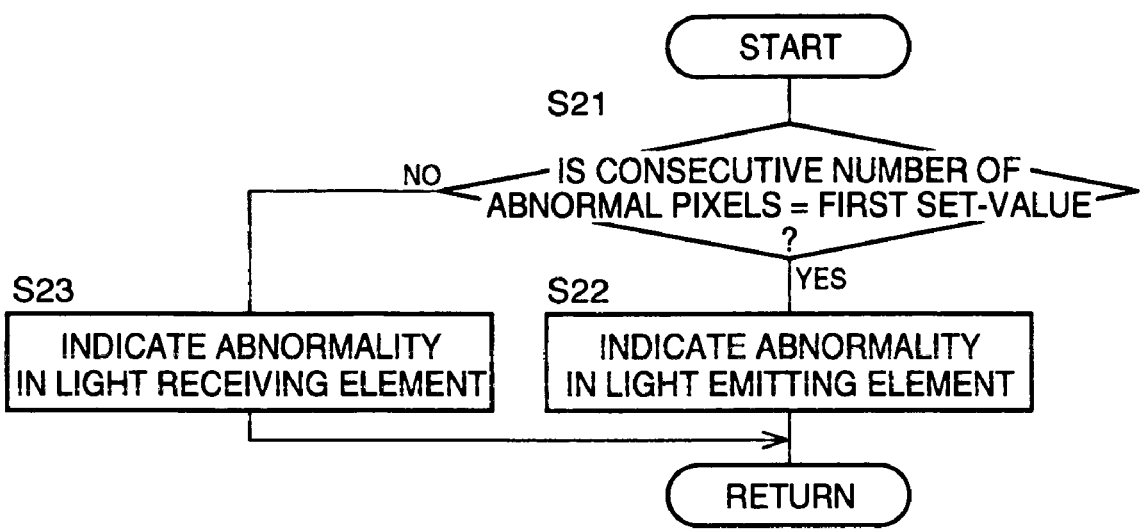
FIG. 5 is a flow chart illustrating the details of processing performed in a step S12 indicated in FIG. 4.

There will be described below the operations of the facsimile machine 10 in accordance with the present embodiment by referring to FIGS. 4 and 5 showing the control performed by the CPU 20.

For example, once the control panel 13 is manipulated by the user who wishes to transmit signals, the CPU 20 receives from the control panel 13 as an operation command, any one of a facsimile function command, a scanning function command, and a copy function command. Upon reception of the operation command, the CPU 20 executes a read-control program illustrated conceptually in a flow chart in FIG. 4.

The read-control program is initiated with a step S1 in which the preprocessing of a white reference correction (i.e., a shading correction) is performed. The correction is carried out for the purpose of correcting a shading distortion caused due to the characteristics of an optical system employed in the facsimile machine 10.

In the present embodiment, a white reference member (not shown) is disposed over the aforementioned CIS glass (i.e., over the travel path of the original document W) in order to implement the white reference correction. Once the light emitting device 51 is activated prior to an image reading operation, that is, prior to a delivery of the original document W to above the CIS glass, the CIS 52 receives light which exits from the light emitting device 51 and then reflects at the white reference member.

Prior to the image reading operation, the CPU 20 activates the CIS driver 53 to sequentially obtain: light sensitive data (hereinafter, referred to as "white data") sensitive to the amount of light received at the CIS 52 for each respective pixel, during an active state of the light emitting device 51; and light sensitive data (hereinafter, referred to as "black data") representative of the amount of light received at the CIS 52 for each respective pixel, during an inactive state of the light emitting device 51.

The CPU 20 then stores the obtained white and black data into the RAM 23. These operations performed by the CPU 20 prior to the image reading operation correspond to the aforementioned preprocessing of the white reference correction. For the preprocessing of the white reference correction, the CPU 20 functions as a portion of the facsimile machine 10 which obtains light sensitive signals in corporation with the CIS driver 53.

During the later image-reading-operation where the CIS 52 sequentially transmits to the CPU 20 light sensitive data for each pixel, the CPU 20 performs the white reference correction so as to retrieve a portion of the white and black data from the RAM 23 which is common in position of pixel to a portion of the light sensitive data received from the CPU 20 for each pixel. The CPU 20 then corrects the light sensitive data, according to a given rule, based on the retrieved white and black data.

Based on the corrected light-sensitive data, a resultant image is reproduced for formation. These operations performed by the CPU 20 during the image reading operation correspond to a primary portion of the total processing of the white reference correction.

In the present embodiment, the detection of abnormal pixels is performed using the aforementioned white and black data, which have been obtained for the white reference correction (i.e., the shading correction). In order to implement the detection, a step S2 is implemented to determine whether or not the above-mentioned operation command currently issued coincides with the facsimile function operation. If the current operation command coincides with either the scanning operation command or the copy operation command, then the determination of the step S2 becomes negative "NO." The step S2 is followed by a step S3 in which a corresponding one of the above-described scanning operation and copy operation to the current operation command is performed.

On the other hand, if the current operation command coincides with the facsimile operation command, then the determination of the step S2 in turn becomes affirmative "YES." The step S2 is followed by a step S4 in which a calculation is made based on the aforementioned white and black data per pixel of a difference in amount of light received between the white and the black data.

Where there is no kind of abnormality found in each pixel, the difference in amount of light received which has been calculated for the each pixel is naturally expected to become not less than a predetermined threshold value.

On the other hand, for example, where there is such a kind of abnormality that the LEDs of the light emitting device 51 or the light receiving chips 55 malfunction in obtaining the white data, or where there is such a kind of abnormality that a foreign matter is present in an optical path, along which light from the light emitting device 51 reflects at the white reference member into the CIS 52, there is naturally expected the presence of such at least one pixel that the corresponding difference in amount of light received as calculated based on the aforementioned white and black data becomes less than the predetermined threshold value.

In view of the above findings, a step S5 is then implemented to determine whether or not the difference in amount of light received as calculated based on the white and black data per pixel is more than the predetermined threshold value. The step S5 is further implemented to detect as at least one "abnormal pixel" at least one of the plurality of pixels for which the difference in amount of light received is less than the threshold value. For implementation of the step S5, the CPU 20 functions as a portion of the facsimile machine 10 which detects at least one abnormal pixel.

The threshold value is set to have a given allowance in expectation of variation over time in amount of light received by each PD of the CIS 52. The threshold value is set slightly higher than the difference in amount of light received between the white data representing, for example, 50% of the maximum level of the amount of light which is received by the CIS 52 at the beginning of a series of uses of the CIS 52, and the black data.

If no abnormal pixel is detected, then the determination of the step S5 becomes negative "NO," which represents that a normal image-reading-operation is possible to be achieved. Therefore, in this case, a step S9 is then implemented to perform the image reading operation as usual, to thereby achieve a facsimile transmission using the image data obtained during the image reading operation.

On the other hand, if at least one abnormal pixel is detected, then the determination of the step S5 becomes affirmative "YES." The step S5 is followed by a step S6 in which there is detected as a "consecutive number" the number of ones adjacent to each other of the abnormal pixels detected as a result of the implementation of the step S5.

The CPU 20 then proceeds to a step S7 in which a determination is made as to whether or not the detected consecutive number is equal to the reference value. For implementing the step S7, the CPU 20 functions as a first determining device of the facsimile machine 10.

In the present embodiment, the above-described reference value includes a plurality of first set-values used for detecting a failure of the light emitting device 51, and a plurality of second set-values used for detecting a failure of the CIS 52.

As described above, the light emitting device 51, which has been segmented into 4 LED blocks 54 each having 7 LEDs, is driven individually for each block. A degradation in performance of a single one of the LEDs, for example, would cause the 7 LEDs to concurrently become incapable of emitting light, the 7 LEDs belonging to one of the LED blocks 54 that the fault single LED belongs to. Similarly, a disconnection of a supply line for supplying drive current to one of the LED blocks 54, for example, would cause the 7 LEDs which belong to the fault LED block 54 to concurrently become incapable of emitting light.

A failure of the LED blocks 54 would cause a decrease in amount of light received, which amount is represented by the white data, at approximately 646 consecutive pixels (=2,584 pixels/4 blocks) within an illuminated area by light emitted from one of the LED blocks 54. It follows that the consecutive pixels correspond to abnormal pixels. Concurrent failures of two adjacent ones of the LED blocks 54 would cause approximately 1,292 consecutive pixels (=646 pixels×2 blocks) to become abnormal pixels.

Therefore, in the present embodiment, the reference value includes the plurality of first set-values to be used for detecting at least one abnormal pixels due to a failure of at least one of the LED blocks 54. The plurality of first set-values are expressed by the following expression, provided that a number M of adjacent ones of the LED blocks 54 is incremented sequentially to 1, 2, 3, and 4:

$$646 \times M.$$

Namely, the first set-values are provided to be equal in total number to the LED blocks 54, and each one of the first set-values is provided to be equal in magnitude to a number M (M: a variable integer from 1 to 4) times the number of consecutive pixels which are to be illuminated by a single one of the LED blocks 54.

However, described by way of an example where one of the LED blocks 54 fails, the consecutive number of abnormal pixels does not always coincide exactly with the number of consecutive pixels concurrently illuminated by light emitted from the fault LED block 54, that is, 646. Similarly, in the case where two adjacent ones of the LED blocks 54 concurrently fail, the consecutive number of abnormal pixels does not always coincide exactly with the number of consecutive pixels illuminated by light emitted from the two adjacent fault LED blocks 54, that is, 1,292.

Therefore, in the present embodiment, there is provided with each one of the first set-values an allowable range of minus 5% to plus 5% centered at the each first set-value. For example, if the consecutive number of abnormal pixels falls within the range of 613 to 679, then it is determined that the consecutive number substantially coincides with one of the first set-values, the number M of which is equal to 1.

Therefore, the allowable range of each first set-value is defined such that the lower limit is equal to (646×M)×0.95, while the upper limit is equal to (646×M)×1.05.

There has been described the relationship between the number of the LED blocks 54 and the consecutive number of abnormal pixels for a better understanding of the plurality of the first set-values. Similarly, there will be described a relationship between the number of the light receiving chips 55 and the consecutive number of abnormal pixels for a better understanding of the plurality of the second set-values.

As described above, similarly with the LED blocks 54, the CIS 52, which includes the 17 light receiving chips 55 each having 152 PDs, is driven on a per chip basis.

More specifically, a degradation in performance of a single one of the PDs, for example, would cause the 152 PDs to concurrently become incapable of producing the corresponding light-sensitive-signals. The 152 PDs belong to one of the light receiving chips 55 that the fault single PD belongs to.

Similarly, if there occurs a disconnection of a power supply line for supplying drive current to one of the light receiving chips 55, or a disconnection of a transport line for transporting the light sensitive data received from one of the light receiving chips 55, the 152 PDs would be caused to concurrently become incapable of producing the corresponding light-sensitive-signals. The 152 PDs belong to one of the light receiving chips 55 that fails.

A failure of one of the plurality of light receiving chips 55 would lead to the detection of 152 consecutive pixels to be covered by the fault light-receiving-chip 55 as abnormal pixels. In addition, concurrent failures of two adjacent ones of the light receiving chips 55 would cause 304 consecutive pixels (=152 pixels×2 chips) to become abnormal pixels.

Therefore, in the present embodiment, the reference value includes the plurality of second set-values to be used for detecting an abnormality due to a failure of at least one of the light receiving chips 55. The plurality of second set-values are expressed by the following expression, provided that a number N of adjacent ones of the light receiving chips 55 is incremented sequentially to 1, 2, 3, . . . , 17:

$$152 \times N.$$

Namely, the second set-values are provided to be equal in total number to the light receiving chips 55, and each one of the second set-values is provided to be equal in magnitude to a number N (N: a variable integer from 1 to 17) times the number of consecutive pixels which are to be covered by a single one of the light receiving chips 55.

However, described by way of an example where one of the light receiving chips 55 fails, the consecutive number of abnormal pixels does not always coincide exactly with the number of consecutive pixels concurrently covered by the fault light-receiving-chip 55, that is, 152. Similarly, in the case where two adjacent ones of the light receiving chips 55 concurrently fail, the consecutive number of abnormal pixels does not always coincide exactly with the number of consecutive pixels covered by the two adjacent fault light-receiving-chips 55, that is, 304.

Therefore, in the present embodiment, there is provided with each one of the second set-values an allowable range of minus 5% to plus 5% centered at the each second set-value. For example, if the consecutive number of abnormal pixels falls within the range of 144 to 160 pixels, then it is determined that the consecutive number of abnormal pixels substantially coincides with one of the second set-values, the number N of which is equal to 1.

Therefore, the allowable range of each second set-value is defined such that the lower limit is equal to (152×N)×0.95, while the upper limit is equal to (152×N)×1.05.

If the consecutive number of abnormal pixels is substantially equal to neither the plurality of first set-values (including the respective allowable ranges) nor the plurality of second set-values (including the respective allowable ranges), then the determination of the step S7 becomes negative "NO." In this case, there is determined that an abnormality in the light sensitive data is not due to a failure of the light emitting device 51 or a failure of the CIS 52, but due to a foreign matter such as dirt adhering to the above-mentioned CIS glass or a CIS lens.

The step S7 is followed by a step S10 in which an annunciation operation is performed for indicating to the user the presence of an abnormality due to a foreign matter. More specifically, a message indicating that "Cleaning is required." is displayed on the above-described LCD 14, or the message is voice-outputted via the speaker 34.

In the present embodiment, the image reading operation is then performed as to an original document W once it has been delivered to an image reading position, and thereafter the facsimile transmission of the read image is performed. However, the present invention may be practiced such that, after the implementation of the step S10, neither the facsimile transmission operation nor the image reading operation is performed.

If the consecutive number of abnormal pixels is substantially equal to any one of the plurality of first set-values or any one of the plurality of second set-values, then the determination of the step S7 becomes affirmative "YES." In this case, it is considered that the abnormality due to a failure of either the light emitting device 51 or the CIS 52 is present. The abnormality, as considered as a temporary abnormality, may be possible to be eliminated by an additional power-on of the facsimile machine 10, for example.

Therefore, in the present embodiment, the above-described annunciation operation is varied in mode depending on the number of times that it was repeatedly determined that the consecutive number of abnormal pixels substantially coincides with any one of the plurality of first set-values or any one of the plurality of second set-values. The above number of times will be hereinafter referred to as "coincidence frequency." The coincidence frequency is stored in the EEPROM 22 formed in a non-volatile memory.

More specifically, the step S7 is followed by a step S8 in which a determination is made as to whether or not the coincidence frequency is less than three. If the coincidence frequency is less than three, then the determination of the step S8 becomes affirmative "YES."

In this case, the step S8 is followed by a step S11 in which the annunciation operation is performed for indicating to the user the presence of a temporary abnormality. More specifically, a message indicating that "The document failed to be read normally. Please power on the facsimile machine again for retransmission of the document.", for example, is displayed on the above-described LCD 14, or the message is voice-outputted via the speaker 34.

It is noted that the step S8 is preferably skipped before the read-control program has been executed three times or more in order to avoid an unintended implementation of the step S11.

After the above annunciation operation, once the original document W has been delivered to the image reading position, the image reading operation is performed, while the facsimile transmission is not performed. Based on image data representing the read image, the recording sheet is printed by the printer 31.

If the coincidence frequency is equal to or more than three, then the determination of the step S8 becomes negative "NO."In this case, it is not reasonable that the current abnormality is categorized as a temporary abnormality. For the reason, the step S8 is followed by a step S12 in which the annunciation operation is performed for indicating the presence of an abnormality of an optical device including the light emitting device 51 and the CIS 52.

Described more specifically with regard to the step S12, as shown in FIG. 5, a step S21 is implemented to determine whether or not the consecutive number of abnormal pixels is substantially equal to any one of the above-mentioned plurality of first set-values. If so, then the determination of the step S21 becomes affirmative "YES." The step S21 is followed by a step S22 in which the annunciation operation is performed for indicating to the user where a failure was found and how to solve the problem. More specifically, a message indicating "A failure was found in the light emitting device. Please contact the manufacturer.", for example, is displayed on the above-described LCD 14, or the message is voice-outputted via the speaker 34.

After the above annunciation operation, once the original document W has been delivered to the image reading position, then the image reading operation is performed, similarly with the case where the step S11 is implemented, while the facsimile transmission is not performed. Based on image data representing the read image, the recording sheet is printed by the printer 31.

On the other hand, if the consecutive number of abnormal pixels is substantially equal to any one of the plurality of second set-values, then the determination of the step S21 becomes negative "NO." The step S21 is followed by a step S23 in which the annunciation is performed for indicating to the user where a failure was found and how to solve the problem. More specifically, a message indicating "A failure was found in the CIS. Please contact the manufacturer.", for example, is displayed on the above-described LCD 14, or the message is voice-outputted via the speaker 34.

After the annunciation operation, once the original document W has been delivered to the image reading position, then the image reading operation is performed, similarly with the case where the step S22 is implemented, while the facsimile transmission is not performed. Based on image data representing the read image, the recording sheet is printed by the printer 31.

In the present embodiment, an abnormality due to a failure of the light emitting device 51 or the CIS 52 is detected as a result of a comparison between the detected consecutive number of abnormal pixels and the reference value reflecting the number of LEDs belonging to each LED block 54 in the light emitting device 51 and the number of PDs belonging to each light receiving chip 55 in the CIS 52. The detection is provided by focusing on a small possibility that there is a coincidence in consecutive number between abnormal pixels caused by a failure of the light emitting device 51 or the CIS 52 and those caused by a foreign matter.

Further, in the present embodiment, when abnormal pixels are present but when the consecutive number thereof is not equal to the reference value, it is determined that the abnormality due to a foreign matter (dirt, dust, etc.) in the optical path along which light leaves the light emitting device 51 and reflects at the original document W into the CIS 52. Therefore, the present embodiment allows a detection of not only an abnormality caused by a failure of the light emitting device 51 or the CIS 52 but also an abnormality caused by a foreign matter in a manner to distinguish them from each other.

Still further, in the present embodiment, the difference in amount of light received between the white and the black data is compared with the threshold value set for detecting at least one abnormal pixel. Therefore, in the present embodiment, an adjustment of the threshold value to an appropriate one enables a more thorough detection of all the existing abnormal pixel(s).

Yet further, in the present embodiment, the abnormal pixels are detected during a process in which the light sensitive data (the white and black data) is obtained for the white reference correction (shading correction), by the use of the obtained light sensitive data during the white reference correction. The present embodiment therefore does not require an additional process to obtain light sensitive data associated with the PDs (the pixels) only for detecting an abnormal pixel(s), allowing an efficient detection of an abnormal pixel(s).

Additionally, in the present embodiment, two kinds of abnormalities are separately detected in such a manner that if the consecutive number of abnormal pixels is equal to any one of the first set-values, an abnormality due to a failure of the light emitting device 51 is detected, while, if the consecutive number is equal to any one of the second set-values, an abnormality due to a failure of the CIS 52 is detected. Still additionally, the presence of the abnormalities is indicated to the user via a display on the LCD 14 or a voice outputted from the speaker 34. The present embodiment therefore enables the user to realize which kind of the abnormality has occurred.

Further, in the present embodiment, the annunciation to the user of not only the kind of the abnormality occurring but also the solutions thereto enables the user-sender to realize how to solve the abnormality currently occurring.

Still further, in the present embodiment, while the coincidence of the consecutive number of abnormal pixels with the reference value results in the detection of any one of abnormalities, the kind of the solution to the detected abnormality, as well as the kind of the detected abnormality itself, is varied with the magnitude of the coincidence frequency representing how many times it was repeatedly determined that the consecutive number of abnormal pixels coincides with the reference value.

In view of the above, the present embodiment is configured such that a message, the content of which is varied depending on the above coincidence frequency, is presented to the user, allowing the presentation to the user of a more appropriate or helpful solution.

Yet further, the apparatus according to the present embodiment does not permit the facsimile transmission in the event of an abnormality in the apparatus, to thereby prevent image data which has been deteriorated in quality due to an abnormality occurring during the image reading operation, from being transmitted from the user-sender to a communication equipment at the destination side. As a result, the apparatus avoids the user-sender from having a misunderstanding to make the user-sender falsely recognize that image data which has been transmitted is normal, although the image data is abnormal in fact. In addition, the apparatus avoids a recipient at the destination side from receiving abnormal image data.

Additionally, the apparatus according to the present embodiment allows the printing operation (image formation) of a recording sheet based on data indicative of an image read even in the event of an abnormality in the preceding image-reading-operation, enabling the user-sender to actually identify how accurate to read an image.

While the above description covers one of the embodiments of the present invention described by referring to the figures, the invention may be practiced in other modes.

While the preferred embodiment described above by referring to the drawings is configured such that the light emitting device 51 and the CIS 52 are each designed to be driven on a per block basis, the present invention may be practiced in such a mode that all the LEDs belonging to the light emitting device 51 are driven all together, or in such a manner that the whole of the CIS 52 is formed in a unitary light-receiving-chip. For reducing the above-mentioned mode into practice, the reference value may be set, for example, so as to correspond to the number of the PDs belonging to the unitary light-receiving-chip.

Further, while the preferred embodiment described above by referring to the drawings is configured such that the light emitting device 51 includes the blocks each having the same number of the LEDs, the present invention may be practiced in such a mode that the blocks do not each include the same number of the LEDs. In this mode, the reference value may be set so as to correspond to the number of the LEDs individually for each one of the blocks.

Still further, while the preferred embodiment described above by referring to the drawings is configured such that the CIS 52 includes the light receiving chips each having the same number of the PDs, the present invention may be practiced in such a mode that the light receiving chips do not each include the same number of the PDs. In this mode, the reference value may be set so as to correspond to the number of the light receiving elements individually for each one of the light receiving chips.

Yet further, although the preferred embodiment described above by referring to the drawings is configured such that the abnormal pixels are detected using the white and black data captured during the white reference correction, the present invention may be practiced in such a mode that only the white data is obtained when the light emitting device 51 emits light, while the black data is preset to fixed data. In this mode, the amount of light received for each pixel is detected based on the obtained white data and the fixed data, and the detected amount of light received is compared with the threshold value to detect abnormal pixels.

Still yet further, where an output signal from the CIS 52 for each pixel is a binary one which is selectively changed in level to a higher one or a lower one depending on whether or not an entry of light into the CIS 52 is present, the present invention may be practiced in such a mode that abnormal pixels are detected based on the binary signal outputted in association with each pixel during the white reference correction. In this mode, at least one of the plurality of pixels to which the binary signal outputted indicative of the lower level corresponds, is detected as at least one abnormal pixel.

In the preferred embodiment described above by referring to the drawings, while the detection of abnormal pixels is implemented during the white reference correction, the present invention may be practiced in such a mode that, at the time that a background correction is implemented based on the background of a recording sheet, for example, the white and the black data are obtained, using the leading margin of the recording sheet to be traveled, in order to detect at least one abnormal pixel.

While the preferred embodiment described above by referring to the drawings allows neither the detection of abnormal pixels nor the determination of an abnormality in a case where an operation command currently issued corresponds to the scanning operation command or the copy operation command, the present invention may be practiced in such a mode as to, in that case, perform the detection of abnormal pixels and the determination of an abnormality, and to indicate necessary information to the user by displaying a necessary message on the LCD 14, for example.

While the preferred embodiment described above by referring to the drawings employs as a light receiving device the CIS 52 in which light receiving elements (PDs) are aligned in a single line, the CIS 52 may be replaced with a light receiving device in which the light receiving elements are aligned in two or more lines.

While the preferred embodiment described above by referring to the drawings is operated such that the original document W is moved relative to the light emitting device 51 and the CIS 52 which are fixed in position, the present invention may be practiced in such a mode that, while the original documents W is fixed in position, the light emitting device 51 and the CIS 52 are moved in a secondary scanning direction relative to the original document W in order to read the image of the original document W.

While the preferred embodiment described above by referring to the drawings employs what is called contact-type solid-state image pickup technique using the CIS 52 by way of an example, the present invention may be practiced in such a mode that light from an image of the original document W is delivered using an optical system to a solid-state image pickup device such as a CCD and is focused thereat. Even the practice of this mode provides the same effects as the preferred embodiment described above by referring to the drawings.

While the preferred embodiment described above by referring to the drawings allows the image reading operation even in a case where it is determined that a failure is present in the light emitting device 51 or the CIS 52 during the white reference correction prior to the image reading operation, and that an abnormality is present due to the failure, the present invention may be practiced in such a mode as not to allow the image reading operation in such a case.

The above-described mode can avoid an unnecessary implementation of the image reading operation in the presence of an abnormality. In this mode, once the user inserts the same original document W again into the document inlet 15 and issues the scanning operation command or the copy operation command, the determination of the step S2 shown in the FIG. 4 becomes negative "NO," resulting in the scanning or the copying operation (image formation). As a result, this mode enables the user to actually identify how accurate to read an image when necessary.

However, where the image reading operation is performed even when it is determined that an abnormality is present, similarly with the preferred embodiment described above by referring to the drawings, the user can actually identify how accurate to read an image, without the user's added effort.

While the preferred embodiment described above by referring to the drawings is configured such that the annunciation operation is changed in mode depending on whether or not the coincidence frequency is less than a predetermined value which has been set to three by way of an example, the predetermined value may be modified to any other value. However, it is more preferable that the change is made depending on whether or not the coincidence frequency is less than two or three.

The present invention may be practiced in such a mode that, during a process in which a determination is repeatedly made as to whether or not the consecutive number of abnormal pixels substantially coincides with the reference value, the value of the coincidence frequency is reset to zero, once the period of time during in which it is continuously determined that the consecutive number of abnormal pixels has not substantially coincided with the reference value exceeds a predetermined period of time.

In this mode, for example, where a new determination is not made that the consecutive number of abnormal pixels substantially coincides with the reference value even after a predetermined period of time (six months, for example) has lapsed since a first determination was made that the consecutive number of abnormal pixels substantially coincided with the reference value, the previous abnormality is considered to be a temporary one, and the value of the coincidence frequency is reset to zero.

In the preferred embodiment described above by referring to the drawings, where an abnormal pixel, although it is contained in the plurality of pixels, exists in the form of a single abnormal pixel without any other adjacent abnormal pixel, it is considered that such a type of abnormality that a foreign matter such as dirt is attached to a single one of the plurality of light-receiving-elements (PDs) which corresponds to the above single abnormal pixel, or is attached to an optical element such as a light-receiving-lens associated with the single light-receiving-element.

The present invention may be therefore practiced in such a mode that a determination is also made as to whether or not the above kind of abnormality exists, and, where the determination is affirmative, the kind of abnormality occurring and the solution thereto are indicated to the user.

In the preferred embodiment described above by referring to the drawings, while image data representative of an image captured during the image reading operation is transmitted via the NCU 25 to the destination-side communication equipment, the present invention may be practiced in such a mode that, for example, the transmission is implemented via the network interface 39. In this mode, in response to issue of a transmission command from the user, various kinds of processing such as the above-mentioned abnormal pixel detection, abnormality diagnosis, and annunciation on abnormality, etc., may be performed.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An apparatus for reading an image on a medium to be read, comprising:
   a light emitting device that emits light to illuminate the medium;
   a light receiving device, including a plurality of light receiving elements aligned with each other, that receives a reflected light from the medium via the plurality of light receiving elements; and
   a controller that obtains light sensitive signals from the respective plurality of light receiving elements in association with a respective plurality of pixels of the image which correspond to the respective plurality of light receiving elements, and that reads the image based on the obtained light sensitive signals,
   wherein the controller:
      causes, prior to a normal reading operation of the image, the light emitting device to perform a light emission,
      obtains the plurality of light sensitive signals from the plurality of light receiving elements, respectively, in response to the light emission, and determines that, based on the obtained plurality of light sensitive signals, at least one of the light emitting device and the light receiving device malfunctions when a consecutive number of abnormal pixels existing adjacent to each other reaches a predetermined reference value.

2. The apparatus according to claim 1, wherein the controller comprises:
(a) a detecting device that causes, prior to the normal reading operation, the light emitting device to perform the light emission, obtains the plurality of light sensitive signals from the plurality of light receiving elements, respectively, in response to the light emission, and detects, based on the obtained plurality of light sensitive signals, at least one of the plurality of pixels as at least one abnormal pixel;
(b) a first determining device that determines whether or not the consecutive number of the detected at least one abnormal pixel substantially coincides with the reference value; and
(c) a second determining device that determines that at least one of the light emitting device and the light receiving device malfunctions when the first determining device has determined that the consecutive number substantially coincides with the reference value.

3. The apparatus according to claim 2, wherein the second determining device determines that a foreign matter is present between the light emitting device and the light receiving device when the first determining device has determined that the consecutive number does not substantially coincide with the reference value.

4. The apparatus according to claim 2, wherein the detecting device causes, prior to the normal reading operation, the light emitting device to perform the light emission, obtains the plurality of light sensitive signals from the respective plurality of light receiving elements in response to the light emission, and detects at least one of the plurality of pixels which corresponds to at least one of the plurality of light receiving elements which has received light at a level not higher than a predetermined level as the at least one abnormal pixel.

5. The apparatus according to claim 2, wherein the detecting device causes the light emitting device to illuminate a white reference member, obtains the plurality of light sensitive signals from the respective plurality of light receiving elements upon reception by the light receiving device of a reflected light from the white reference member, and determines the at least one abnormal pixel based on the obtained plurality of light sensitive signals.

6. The apparatus according to claim 1, wherein the controller causes the light emitting device to illuminate a white reference member, prior to the normal reading operation of the image, obtains the plurality of light sensitive signals from the plurality of light receiving elements, respectively, in response to reception by the light receiving device of a reflected light from the white reference member, and performs a white reference correction and the detection of abnormal pixels based on the obtained plurality of light sensitive signals.

7. The apparatus according to claim 2, wherein the light emitting device comprises a plurality of light emitting elements aligned in a scanning direction of the light receiving device, the plurality of light emitting elements being segmented into a plurality of blocks aligned in the scanning direction, the light emitting device being driven on a per block basis,
wherein there are selected as a plurality of selected light-emitting-elements ones of the plurality of light emitting elements which belong to at least one of the blocks, a number of the at least one block being predetermined,
wherein the reference value is a set value set based on a number of ones of the plurality of pixels which are positioned in an illuminated area on the medium to be read which is illuminated with light exiting from the plurality of selective light-emitting-elements,
and wherein the second determining device determines that the light emitting device malfunctions when the first determining device has determined that the consecutive number substantially coincides with the set value.

8. The apparatus according to claim 7, wherein the plurality of light emitting blocks each comprise the same number of ones of the plurality of light emitting elements, and wherein the set value is as a predetermined number of integer times large as a number of ones of the plurality of pixels which are positioned within an illuminated area on the medium to be read which is illuminated with light exiting from ones of the plurality of light emitting elements which correspond to one of the plurality of light emitting blocks.

9. The apparatus according to claim 2, wherein the light receiving device comprises a plurality of light receiving blocks, each of which include a plurality of light receiving elements, respectively, with the plurality of light receiving blocks being aligned in a scanning direction of the light receiving device,
wherein ones of the plurality of light receiving elements which belong to a predetermined number of ones of the plurality of light receiving blocks are selected as a plurality of selected light-receiving-elements, respectively,
wherein the reference value is a set value set based on a number of ones of the plurality of pixels, reflected light from which enters the plurality of selected light-receiving-elements,
and wherein the second determining device determines that the light receiving device malfunctions, in response to a determination by the first determining device that the consecutive number substantially coincides with the set value.

10. The apparatus according to claim 9, wherein the plurality of light receiving blocks each comprise the same number of ones of the plurality of light receiving elements,
and wherein the set value is as a predetermined number of integer times large as a number of ones of the plurality of pixels, reflected light from which enters ones of the plurality of light receiving elements which belong to one of the plurality of light receiving blocks.

11. The apparatus according to claim 2, further comprising an indicator that indicates a determination made by the second determining device.

12. The apparatus according to claim 11, wherein the indicator is varied in action for indication depending on a frequency at which the first determining device has repeatedly determined that the consecutive number substantially coincides with the reference value.

13. The apparatus according to claim 11, wherein the indicator is varied in action for indication depending on a frequency at which the second determining device has repeatedly determined that at least one of the light emitting device and the light receiving device is abnormal.

14. The apparatus according to claim 1, further comprising a transmitter that transmits image data indicative of an image which has been read by the apparatus, to a destination-side communication equipment via a communication network, the transmitter being adapted to become incapable of a transmission of image data indicative of an image which has been read by the apparatus, in response to a determination by the controller that at least one of the light emitting device and the light receiving device is abnormal.

15. The apparatus according to claim 1, further comprising an image forming device that forms an image on a recording medium to represent the image read by the apparatus, the image forming device being adapted to maintained capable of forming the image read by the apparatus, even in response to a determination of the controller that at least one of the light emitting device and the light receiving device is abnormal.

16. A facsimile machine capable of reading an image on a medium to be read, comprising:
- a light emitting device that emits light to illuminate the medium;
- a light receiving device, including a plurality of light receiving elements aligned with each other, that receives a reflected light from the medium via the plurality of light receiving elements;
- a controller obtains light sensitive signals from the respective plurality of light receiving elements in association with a respective plurality of pixels of the image which correspond to the respective plurality of light receiving elements, and that reads the image based on the obtained light sensitive signals;
- a transmitter that transmits, externally to the facsimile machine, image data indicative of the image which has been read by the controller; and
- an image forming device that forms an image on a recording medium to represent the image which has been read by the controller,
- wherein the controller;
  - causes, prior to a normal reading operation of the image, the light emitting device to perform a light emission,
  - obtains the plurality of light sensitive signals from the plurality of light receiving elements, respectively, in response to the light emission, and
  - determines that, based on the obtained plurality of light sensitive signals, at least one of the light emitting device and the light receiving device malfunctions when a consecutive number of abnormal pixels existing adjacent to each other reaches a predetermined reference value.

17. The facsimile machine according to claim 16, wherein the controller is adapted such that, upon determination by the controller that at least one of the light emitting device and the light receiving device malfunctions, a facsimile function is not allowed, while at least one of a copying and a scanning function is allowed.

* * * * *